Figure 1:
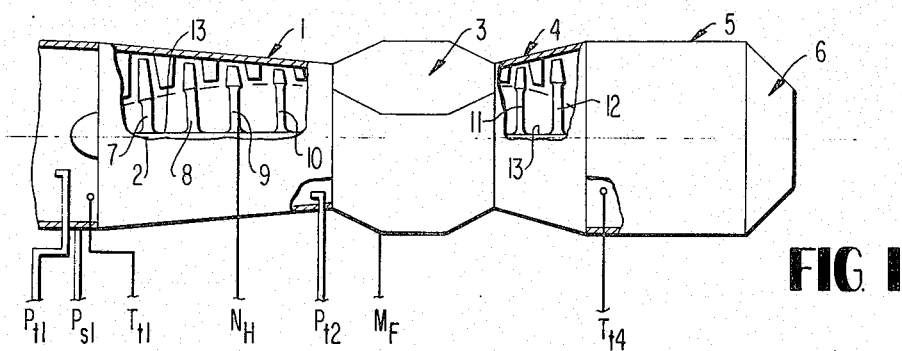

United States Patent [19]
Bauerfeind

[11] 3,882,672
[45] May 13, 1975

[54] SYSTEM ARRANGEMENT FOR GOVERNING GAS TURBINE ENGINES, ESPECIALLY GAS TURBINE AERO-ENGINES

[75] Inventor: Klaus Bauerfeind, Munich, Germany

[73] Assignee: Motoren-und Turbinen-Union Munchen GmbH, Munich, Germany

[22] Filed: Feb. 5, 1973

[21] Appl. No.: 329,314

[30] Foreign Application Priority Data
Feb. 5, 1972  Germany............................ 2205445

[52] U.S. Cl. ............................................ 60/39.28 R
[51] Int. Cl. .............................................. F02c 9/08
[58] Field of Search ................. 60/39.28 R, 39.28 T

[56] References Cited
UNITED STATES PATENTS

| | | | |
|---|---|---|---|
| 2,948,114 | 8/1960 | Beslier ........................... | 60/39.28 R |
| 3,068,648 | 12/1962 | Fleming.......................... | 60/39.28 T |
| 3,076,312 | 2/1963 | Haigh............................. | 60/39.28 R |
| 3,187,504 | 6/1965 | Herbert.......................... | 60/39.28 R |
| 3,240,014 | 3/1966 | Schorn........................... | 60/39.28 R |
| 3,242,673 | 3/1966 | Urban............................ | 60/39.28 R |
| 3,295,315 | 1/1967 | Urban............................ | 60/39.28 R |
| 3,357,177 | 12/1967 | Cornett.......................... | 60/39.28 R |
| 3,421,317 | 1/1969 | Bedford......................... | 60/39.28 R |
| 3,606,754 | 9/1971 | White ............................ | 60/39.16 |
| 3,764,785 | 10/1973 | Harner........................... | 60/39.28 R |

Primary Examiner—Clarence R. Gordon
Attorney, Agent, or Firm—Craig & Antonelli

[57] ABSTRACT

A system arrangement for the control of acceleration processes in gas turbine engines, especially gas turbine aero-engines. The system arrangement includes means for measuring the actual ratio of pressures at the outlet and inlet of the compressor operating in front of the combustion chamber and providing signal values indicative of the measured pressure ratio, means for comparing the measured pressure ratio signal values with a set of predetermined pressure ratio signal values for an operating range of the engine which predetermined signal values are set below the value corresponding to compressor surge, and means for controlling the metered fuel value for the engine in response to the actual measured signal value exceeding the predetermined pressure ratio signal value.

30 Claims, 6 Drawing Figures

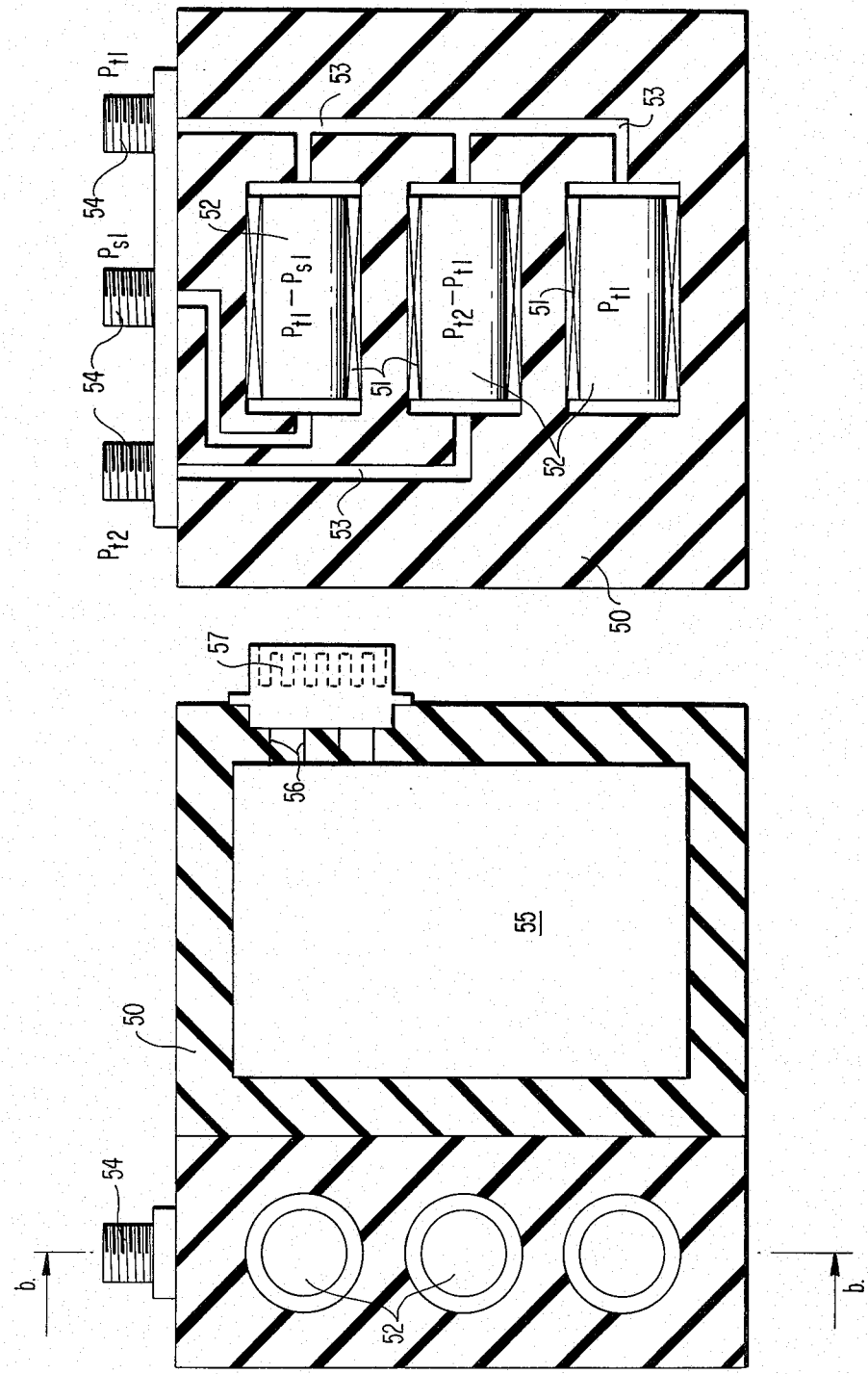

SYSTEM ARRANGEMENT FOR GOVERNING GAS TURBINE ENGINES, ESPECIALLY GAS TURBINE AERO-ENGINES

The present invention relates to an electronic control system for gas turbine engines in particular to gas turbine aero-engines. The system in a somewhat simplified form is also applicable to industrial gas turbine engines.

In gas turbine engines the most important requirement for engine acceleration is the prevention of surge and stall in the compressor upstream of the combustion chamber. A further requirement may be to limit the turbine inlet temperature. Up till now, this has been achieved in various ways. The most common method is to limit the rate of fuel delivery using signals from suitable engine parameters such as engine shaft speed, pressures and, possibly, temperatures. Under varying inlet conditions the fuel flow can be scheduled at a rate approximately that required by using thermodynamic non-dimensional laws. Another well-known method is to limit the rate of acceleration. A limiting value of the acceleration parameter $\dot{N}/P_{t1}$ is specified in advance and with the aid of a closed-loop circuit, the fuel flow is regulated by comparing the actual value with this limiting value so that a suitable acceleration results. Another proposed system is CART (Combined Acceleration and Range Temperature Control) in which the flow Mach number is measured between the compressor outlet and the combustion chamber inlet and is limited to a fixed value during acceleration by means of a closed loop circuit changing the fuel flow.

Under certain conditions these control methods give reasonably satisfactory results. Common to each of these control methods is the use of an auxiliary parameter, for example, metered fuel flow $M_F$, $\dot{N}/P_{t1}$, compressor outlet Mach number, to achieve its purpose, i.e. the prevention of compressor surge. This objective is attained as long as the thermo-dynamic non-dimensional laws strictly hold. However unsatisfactory results are obtained under conditions where the thermo-dynamic non-dimensional laws are only approximately valid and the most common shortcomings arise from the following basic factors:

variation of the specific heat of the working fluid with change in inlet temperature;
variation of Reynolds number in the turbo machines with change in inlet pressure and temperature;
change in combustion efficiency (this causes difficulty only in systems using metered fuel flow);
the difference between a cold and a hot engine where the latter requires less fuel for the same acceleration; and
air and power offtake where no suitable signal for modification of the control system or closed loop is available.

With reference to compressor surge, in order to be on the safe side under all conditions, each of these systems gives away an appreciable amount of acceleration potential of the engine or in other words, for a required acceleration performance the compressor requires extra surge margin which is used only under extreme conditions. In order to avoid this problem, several solutions have been proposed. For example, an acceleration control has been proposed in which the fuel is reduced when the first sign of surge appears. Although, such a system, if it could be realized, would undoubtedly give the quickest acceleration, its feasibility appears questionable on account of the difficulty of predicting compressor surge promptly.

Accordingly, it is an object of the present invention to provide a control system for gas turbine engines which overcomes the disadvantages of prior art systems.

The present invention is based on a proposal to regulate the acceleration of gas turbine engines. At the outset, the respective disadvantages of some devices already known have been discussed. The proposed acceleration regulator for gas turbine engines includes control features which ensure that optimum acceleration with no unstable reactions will occur for a wide range of inlet conditions. Further this control system is characterized by its high degree of safety and relatively simple construction. In particular, as a solution to the problem previously described, the present device operates on a predetermined compressor run-up line for all accelerations. This line is defined by the ratio of the static or total compressor inlet and outlet pressures either as a function of compressor speed related to compressor inlet temperature, $N/\sqrt{T_{t1}}$, or as a function of compressor inlet flow related to compressor inlet conditions $M_1 \sqrt{T_{t1}}/P_{t1}$. The choice between the relative speed or the relative mass flow depends on the slope of the lines $N/\sqrt{T_{t1}}$=constant in the compressor characteristic. The flatter these lines, the more desirable is the use of $M_1\sqrt{T_{t1}}/P_{t1}$. This parameter can conveniently be established by means of $\Delta P_{t-s1}/P_{t1}$ in the compressor inlet plane where $\Delta P_{t-s1}$ is the difference between the total and static pressure (see the description of FIGS. 2 and 3).

Figure 2:
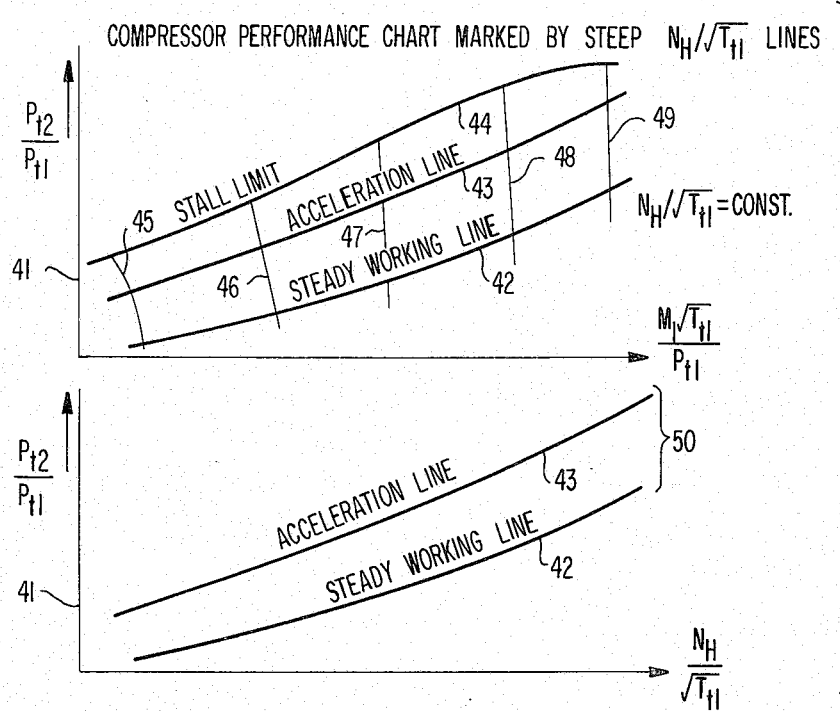
Figure 3:
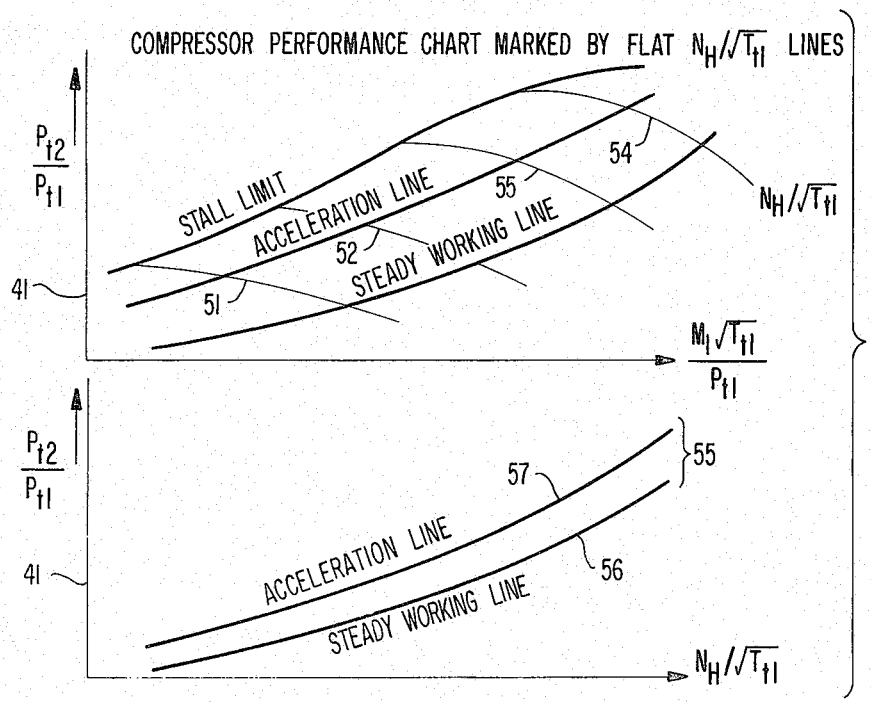
Figure 4:
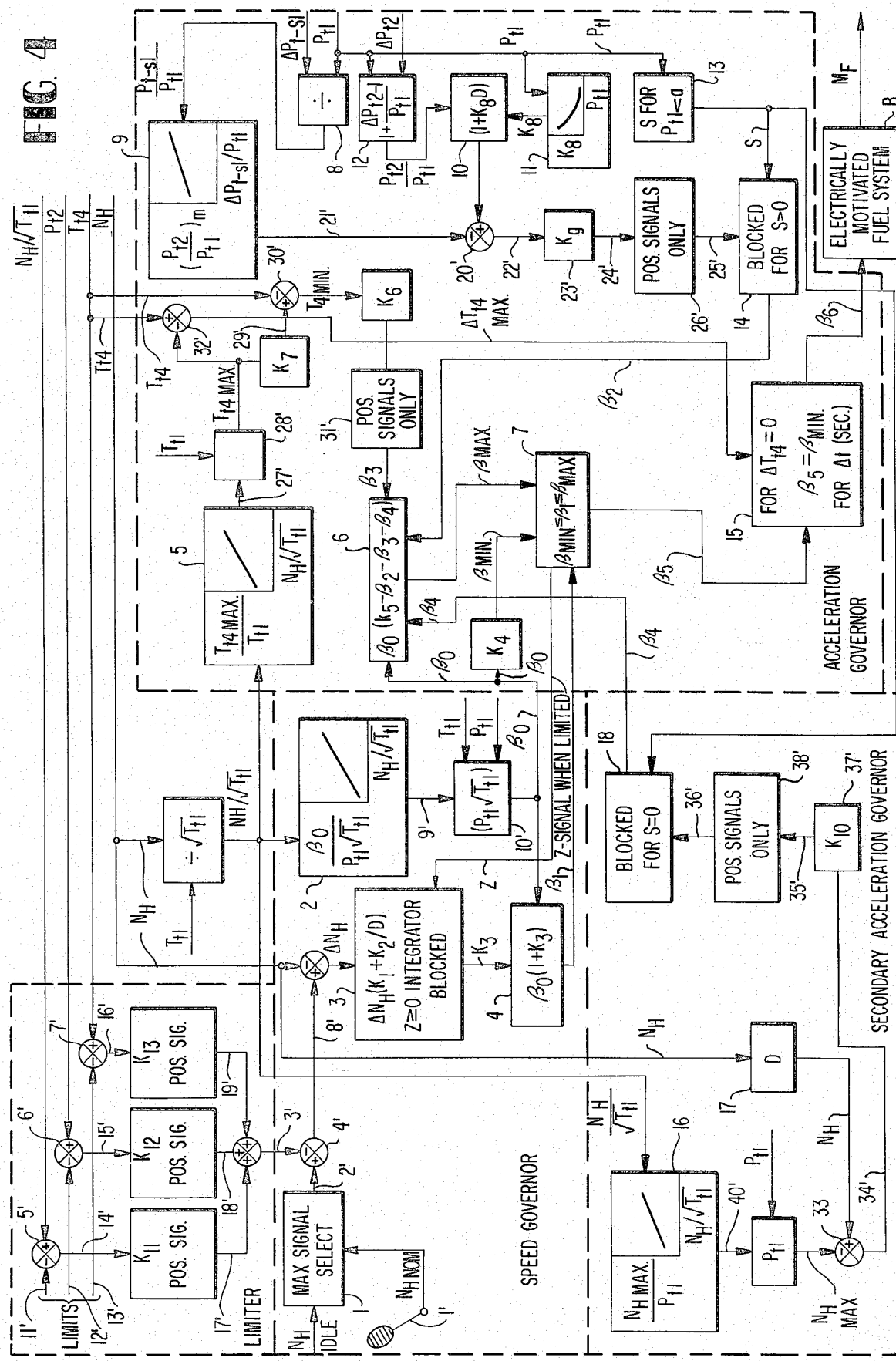

These and other objects, features and advantages of the present invention will become more obvious from the following description when taken in connection with the accompanying drawings which show, for purposes of illustration only, several embodiments in accordance with the present invention, and wherein:

FIG. 1 is a lateral schematic diagram of a single spool jet engine partly cut away for clarity of presentation, FIGS. 2 and 3 are diagrams illustrating fundamental aspects of compressor performance characteristics on which the system of the present invention is based, FIG. 4 is a schematic diagram showing the electronic control system of the present invention, and FIGS. 5a and 5b are schematic sectional views of the heat insulated box for housing the transducers and electronic control system of the present invention.

Referring now to the drawing, FIG. 1 illustrates a conventional single spool, straight jet engine with symbols and engine positions in common use in engine control work being indicated and comprising a compressor 1 arranged in a co-axial position relative to the engine center line 2, an annular combustion chamber 3, a turbine 4, and an afterburner pipe 5, having a variable thrust nozzle 6. The rotors 7, 8, 9, and 10 of the compressor 1 are connected with the discs 11, 12, of the turbine 4, through a common shaft 13. This system is also applicable to multispool gas turbine engines or multi-spool by-pass engines wherein the present invention then relates to the high pressure part. (HP compressor together with HP turbine).

The following is a list of symbols for parameters measured by means of suitable gauges at the engine positions shown on FIG. 1:

$P_{t1}$-total pressure at compressor inlet;
$P_{s1}$-static pressure at compressor inlet;

$T_{t1}$-total temperature at compressor inlet;
$P_{t2}$-total pressure at compressor outlet;
$T_{t4}$-total temperature downstream of turbine;
$M_F$-fuel flow through combustion chamber;
$N_H$-shaft rotational speed (of HP shaft in the case of multi-spool engines); and
$M_1$-compressor inlet mass flow.

The following is a listing of quantities utilized in the description of the present invention:

$\Delta P_{t2-1}$-difference between total pressures at compressor outlet and inlet;
$\Delta P_{t-s1}$-difference between total pressure and static pressure at compressor inlet;
$\beta_{0-6}$-electrical signals to control fuel flow;
$K_{1-13}$-constants;
$s$, $z$-blocking signals;
$P_{t2}/P_{t1}$-total pressure at compressor outlet related to compressor inlet condition;
$T_{t4}/T_t$-total temperature at turbine outlet related to compressor inlet condition;
$M_F/\sqrt{T_{t1}}P_{t1}$-fuel flow through combustion chamber related to compressor inlet conditions;
$M_1\sqrt{T_{t1}}/P_{t1}$-air flow at compressor inlet related to compressor inlet conditions;
$N/\sqrt{T_{t1}}$-rotational shaft speed related to compressor inlet condition;
$\dot{N}$-shaft rotational acceleration;
$\dot{N}/P_{t1}$-shaft rotational acceleration related to compressor inlet condition;
$D$-$d/dt$; and
Index m-maximum allowable value.

In the compressor characteristics performance charts of FIGS. 2 and 3 compressor static or total pressure ratios are measured along the ordinates 41. In each of the upper diagrams of FIGS. 2 and 3, mass flow related to compressor inlet conditions $M_1\sqrt{T_{t1}}/P_{t1}$ is measured along the abscissa and in FIG. 2 there is illustrated the steady running or working line 42, the acceleration run-up line 43, and the surge or stall limit line 44.

FIG. 2 shows a compressor characteristic with steep lines $N/\sqrt{T_{t1}}$=constant (labelled from left to right 45, 46, 47, 48 and 49). With a compressor characteristic such as is shown in FIG. 2 with steep speed lines $N/\sqrt{T_{t1}}$, the distance (indicated by a bracket 50) between the steady running line 42 and the acceleration line 43, is sufficient for good control accuracy.

FIG. 3 indicates a compressor characteristic with flat speed lines $N/\sqrt{T_{t1}}$=constant (labelled from left to right 51, 52, 53, 54). FIG. 3 shows that the flatter these speed lines, the more desirable it is to use mass flow related to compressor inlet conditions $M_1\sqrt{T_{t1}}/P_{t1}$ on the abscissa since the distance 55 between the steady running line 56 and the acceleration line 57 would be insufficient for satisfactory control accuracy if $N/\sqrt{T_{t1}}$ were used.

The electronic control system of the present invention is illustrated in FIG. 4 with the basic sections of the system being shown within labelled blocks in dashed line and each section including a plurality of operational units performing the functions indicated in the drawing and operating as discussed below, the units being constructed in a manner known in the art.

The system regulates the compressor ratio at transient conditions in a gas turbine engine where the control system includes the following sections:

Speed Governor

In the speed governor section, a nominal shaft speed $N_{H-nom}$ is preselected by the throttle lever 1'. This speed is compared with a given idling speed $N_{H-idle}$ in unit 1 with the highest value signal being provided as an output 2'. From this signal is subtracted a signal 3' in a subtractor unit 4' which signal 3' is obtained when one or more of the limits 11', 12', 13' are exceeded. The output of unit 4' is a modified nominal signal 8', and the actual speed signal is then subtracted from signal 8' in another subtractor unit and the resultant $\Delta N_H$ signal is multiplied by a proportional and integral (PI) term in multiplier unit 3. However, whenever an additional signal Z is present, integration is stopped. A signal 9' in parallel is outputted from unit 2 in which the mean nondimensional fuel flow signal is stored. The signal 9' is multiplied by $P_{t1}\sqrt{T_{t1}}$ in unit 10' and the $\beta_0$ signal obtained corresponds approximately to the mean steady running fuel flow. The signal K3 supplied from unit 3 is multiplied by $\beta_0$ in the form $(1+K_3)$ in unit 4 and is fed as $\beta_1$ into unit 7 of the acceleration governor.

Limiter

In the limiter section, there are provided limiting devices 5', 6', 7' which perform a simple comparison between the actual values of the parameters ($N/\sqrt{T_{t1}}$, $P_{t2}$, $T_{t4}$) with their limiting values (signals 11', 12', 13' respectively). Only the positive differences (signals 14', 15', 16') are amplified by constants $K_{11}$, $K_{12}$, $K_{13}$ and the sum of the resulting signals 17', 18', 19' is subtracted from the signal 2 in the subtractor unit 4'. Naturally the number and type of the limiting parameters can change from engine to engine. Besides this, I or D-terms (integral or phase-advance terms) can be added to the proportional terms.

Acceleration Governor

In the acceleration governor section, signals $\Delta P_{t-s1}$ and $P_{t1}$ produced by pressure transducers not shown in the diagram serve as inputs to a divider unit 8 to form the abscissa $\Delta P_{t-s1}/P_{t1}$ input to unit 9. Also produced by a pressure transducer not shown in the diagram is a $\Delta P_{t2-1}$ signal which serves as an input to unit 12 which provides an output of the pressure ratio $P_{t2}/P_{t1}$. The actual compressor pressure ratio term $P_{t2}/P_{t1}$ from unit 12 is added to the D-term (phase advance term) in unit 10, which term is a function of $P_{t1}$ (signal K8 from unit 11). From the resultant signal is subtracted the limiting pressure ratio $(P_{t2}/P_{t1})_m$ (signal 21' from unit 9) in a summing unit 20'. The resultant signal 22' is amplified in unit 23' which provides an output signal 24' to unit 26' which provides an output signal 25' such that only positive signals $\beta_2$ pass via unit 26' into unit 6. The signal 25' passing through unit 26' can be blocked in unit 14 if $P_{t1}$ falls below a limiting value stored in unit 13 (signal S from unit 13). In unit 7, the fuel flow signal $\beta$ from the speed governor is limited to $\beta_{min}$ if it is smaller than $\beta_{min}$ and is limited to $\beta_{max}$ should it exceed $\beta_{max}$. The signal $\beta_{min}$ is produced by the multiplication of $\beta_0$ by $K_4$ which is a constant fraction of the steady running fuel flow signal $\beta_0$ and $\beta_{max}$ is produced in unit 6 by multiplying $\beta_0$ by $(K_5-\beta_2-\beta_3-\beta_4)$. The constant $K_5$ represents the maximum possible fuel flow during acceleration from which fuel flow is subtracted correcting terms $\beta_2$, $\beta_3$, $\beta_4$ arising when certain limits are exceeded. The signals $\beta_2$ and $\beta_4$ are produced by the acceleration governor and the auxiliary acceleration governor respectively while $\beta_3$ is produced as a result of a flame-out in the combustion chamber. The signal $\beta_3$ results from the multiplication of $T_{t4\,max}/T_{t1}$ by $T_{t1}$ in unit 5 giving the maximum possible turbine outlet temperature $T_{t4\,max}$ under normal operating conditions (signal 27' via unit 28'). The multiplication of signal $T_{t4}$ by $K_7$ (signal 29') provides the minimum possible turbine outlet temperature $T_{t4\,min}$. In summing unit 30' the actual temperature $T_{t4}$ is subtracted from $T_{t4\,min}$ and the difference is multiplied by $K_8$ with only positive signals being transmitted via unit 31'. The $\beta_3$ output signal of unit 31' ensures that after sudden relighting subsequent to a combustion flame-out, the fuel flow scheduled to the combustion chamber does not exceed a level which could cause the compressor to run into surge. If for any reason compressor surge should occur, the control system provides an immediate reduction of the compressor mass flow which in turn automatically lowers the limiting pressure ratio $(P_{t2}/P_{t1})_m$ and hence reduces the fuel flow through $\beta_2$. In addition, an extra safety circuit can be included which could become particularly valuable if the limiting pressure ratio is specified against $N/\sqrt{T_{t1}}$ instead of against $\Delta P_{t-s1}/P_{t1}$. In this arrangement, the $T_{t4\,max}$ signal is subtracted from $T_{t4}$ and the resulting positive signal $\Delta T_{t4\,max}$ is used as an indication of compressor surge in the presence of which the fuel flow signal $\beta_5$ can be set to $\beta_{min}$ for $\Delta t$ seconds (according to unit 15) in order to build up a stable flow again in the now unloaded compressor. The signal $\beta_6$ from unit 15 controls the fuel flow valve in the fuel metering unit B. The electromagnetic valve in the hydraulic fuel metering unit B preferably includes a compensating device for variable fuel densities.

Secondary Acceleration Governor

The secondary acceleration governor can be used with extremely low engine inlet pressures resulting from low flight Mach numbers at high altitudes where the signals $\Delta P_{t-s1}/P_{t1}$ and $\Delta P_{t2}$ from the pressure transducers would not be accurate enough for the acceleration governor signals or in the case of a fault in the main system. In unit 16, the limiting acceleration parameter $\dot{N}_H/P_{t1}$ provided by signal 40' is stored and the actual value $N_{max}$ obtained after multiplication by $P_{t1}$ is subtracted from the actual acceleration N in the summing unit 33, the actual acceleration $\dot{N}_H$ being obtained after differentiation in unit 17. The signal $\Delta \dot{N}_H$ is processed as signals 34', 35', 36' via units 37' and 38', unit 38' allowing only positive signals to pass. Signal 36' can be blocked in unit 18 when S=O. When S>O, the correcting term $\beta_4$ is subtracted in the same way as $\beta_2$ in the expression for $\beta_{max}$ (unit 6) with the signals being processed as before.

Pressure Transducers

For the translation of pressure signals into electrical signals, different types of transducer can be utilized. Depending on the design principle used, the accuracy of the output will be reduced when the range of absolute pressures, ambient temperatures and vibration levels is increased. As shown in FIGS. 5a and 5b, the transducers are therefore housed in a heat insulated box 50 protected from vibrations, which box is equipped with an automatically thermostatically controlled heating system 51 employing a temperature sensor. As shown, the pressure transducers 52 are interconnected via air manifolds 53 to pressure tappings 54 for detecting the pressures to be measured as shown in FIG. 1. In order to improve the accuracy of measurement further, for a particular parameter, a number of pressure transducers can be arranged in a cascade so that each individual transducer is used only over a limited pressure range for which it is calibrated. A simple electric circuit carries out the switch-over depending on the value of the pressure in question. In addition, division of the pressure signals to give the pressure ratios can be performed in the same box. This avoids the introduction of inaccuracies due to changing ambient conditions. The electronic control system as shown in FIG. 4 may also be enclosed in box portion 55 and interconnected with the necessary control and measurement devices via electrical wires 56 and electrical connector 57. The box itself can be mounted directly on the engine, preferably on the cooler zones close to the compressor inlet.

Obviously, many modifications and variations of the present invention are possible in the light of the above teachings. It should therefore be understood that within the scope of the appended claims, the invention may be practiced otherwise than as specifically described.

I claim:

1. System arrangement for the control of acceleration processes in gas turbine engines, especially gas turbine aero engines of the type having a compressor operating in front of a combustion chamber and a turbine operating behind the combustion chamber, the system arrangement comprising means for measuring the actual ratio of pressures at the outlet and inlet of the compressor and providing output signal values indicative thereof, means for comparing the actual measured compressor pressure ratio signal values with a set of predetermined pressure ratio signal values for an operating range of the engine which predetermined pressure ratio signal values are set below the ratio level signal value corresponding to compressor surge over the operating range of the engine, and means responsive to the actual measured signal value of the compressor ratio exceeding the predetermined pressure ratio signal value for controlling the metered fuel value $\beta$ from a speed governor of the engine to provide a maximum value of $\beta_{max}$ during acceleration and to provide a minimum value of $\beta_{min}$ during deceleration of the engine.

2. A system arrangement according to claim 1, wherein the set of predetermined pressure ratio signal values are a function of the relative compressor speed related to compressor inlet temperature $N/\sqrt{T_{t1}}$.

3. A system arrangement according to claim 1, wherein the set of predetermined pressure ratio signal values are a function of compressor inlet mass flow related to compressor inlet conditions $M_1 \sqrt{T_{t1}}/P_{t1}$.

4. A system arrangement according to claim 3, further comprising means for providing a signal $\Delta P_{t-s1}/P_{t1}$ which is representative of relative mass flow $M_1 \sqrt{T_{t1}}/P_{t1}$ in a plane upstream of the compressor wherein $\Delta P_{t-s1}$ is the difference between total and static pressure.

5. A system arrangement according to claim 1, wherein said means for measuring the actual compressor ratio includes first means for measuring the pressure difference $\Delta P_{t2-1}$ between the outlet and the inlet of the compressor, second means for measuring the compressor inlet pressure $P_{t1}$, and means responsive to said first and second means for providing the actual pressure ratio signal value $P_{t2}/P_{t1}$ in accordance with the equation $P_{t2}/P_{t1}=(\Delta P_{t2-1}/P_{t1}+1)$.

6. A system arrangement according to claim 1, further comprising means for adding a lead term signal value to the actual measured pressure ratio signal value, wherein the lead term signal value varies with flight conditions and is a function of compressor inlet pressure $P_{t1}$.

7. A system arrangement according to claim 1, further comprising means for limiting the maximum output value of the metered fuel flow of the speed governor $\beta_{max}$ as a function of turbine outlet gas temperature when the temperature drops below the normal operating value as occurs in an engine flame-out for ensuring that during reignition the metered fuel flow will prevent compressor surge.

8. A system arrangement according to claim 1, further comprising means for stopping the integration of the speed governor signal at the magnitude value prevailing at the time when the speed governor output signal is limited to one of $\beta_{max}$ and $\beta_{min}$ during acceleration and deceleration until the output signal is no longer limited by one of $\beta_{max}$ and $\beta_{min}$.

9. A system arrangement according to claim 1, further characterized by means for setting a fuel control signal $\beta_5$ at a value of $\beta_{min}$ for a predetermined time interval in response to temperatures normally occuring during at least one of stabilized and transient operation of the engine being exceeded.

10. A system arrangement according to claim 1, further comprising secondary acceleration governor means for controlling acceleration in response to engine pressures falling below a predetermined value, said secondary acceleration governor means limiting the acceleration parameter of the engine rather than the compressor pressure ratio.

11. A system arrangement according to claim 1, further comprising pressure transducer means for providing electrical output signals in accordance with the sensed pressures, said pressure transducers being disposed in a heat insulated housing and protected against vibration, said housing being provided with thermostatically controlled heating system.

12. A system arrangement according to claim 1, further comprising a plurality of pressure transducer means calibrated for different pressure ranges extending over the operating pressure range of the engine for supplying electrical output signals corresponding to the pressure range thereof and means for receiving the appropriate signal from the transducer means corresponding to the existing pressure.

13. A system arrangement according to claim 2, wherein said means for measuring the actual compressor ratio includes first means for measuring the pressure difference $\Delta P_{t2-1}$ between the outlet and the inlet of the compressor, second means for measuring the compressor inlet pressure $P_{t1}$, and means responsive to said first and second means for providing the actual pressure ratio signal value $P_{t2}/P_{t1}$ in accordance with the equation $P_{t2}/P_{t1}=(\Delta P_{t2-1}/P_{t1}+1)$.

14. A system arrangement according to claim 5, further comprising means for adding a lead term signal value to the actual measured pressure ratio signal value, wherein the lead term signal value varies with flight conditions and is a function of compressor inlet pressure $P_{t1}$.

15. A system arrangement according to claim 6, further comprising means for limiting the maximum output value of the metered fuel flow of the speed governor $\beta_{max}$ as a function of turbine outlet gas temperature when the temperature drops below the normal operating value as occurs in an engine flame-out for ensuring that during reignition the metered fuel flow will prevent compressor surge.

16. A system arrangement according to claim 7, further comprising means for stopping the integration of the speed governor signal at the magnitude value prevailing at the time when the speed governor output signal is limited to one of $\beta_{max}$ and $\beta_{min}$ during acceleration and deceleration until the output signal is no longer limited by one of $\beta_{max}$ and $\beta_{min}$.

17. A system arrangement according to claim 8, further characterized by means for setting a fuel control signal $\beta_5$ at a value of $\beta_{min}$ for a predetermined time interval in response to temperatures normally occuring during at least one of stabilized and transient operation of the engine being exceeded.

18. A system arrangement according to claim 9, further comprising secondary acceleration governor means for controlling acceleration in response to engine pressures falling below a predetermined value, said secondary acceleration governor means limiting the acceleration parameter of the engine rather than the compressor pressure ratio.

19. A system arrangement according to claim 10, further comprising pressure transducer means for providing electrical output signals in accordance with the sensed pressures, said pressure transducers being disposed in a heat insulated housing and protected against vibration, said housing being provided with thermostatically controlled heating system.

20. A system arrangement according to claim 11, further comprising a plurality of pressure transducer means calibrated for different pressure ranges extending over the operating pressure range of the engine for supplying electrical output signals corresponding to the pressure range thereof and means for receiving the appropriate signal from the transducer means corresponding to the existing pressure.

21. A system arrangement according to claim 4, wherein said means for measuring the actual compressor ratio includes first means for measuring the pressure difference $\Delta P_{t2-1}$ between the outlet and the inlet of the compressor, second means for measuring the compressor inlet pressure $P_{t1}$, and means responsive to said first and second means for providing the actual pressure ratio signal value $P_{t2}/P_{t1}$ in accordance with the equation $P_{t2}/P_{t1}=(\Delta P_{t2-1}/P_{t1}+1)$.

22. A system arrangement according to claim 21, further comprising means for adding a lead term signal value to the actual measured pressure ratio signal value, wherein the lead term signal value varies with flight conditions and is a function of compressor inlet pressure $P_{t1}$.

23. A system arrangement according to claim 22, further comprising means for limiting the maximum output value of the metered fuel flow of the speed governor $\beta_{max}$ as a function of turbine outlet gas temperature when the temperature drops below the normal operating value as occurs in an engine flame-out for ensuring that during reignition the metered fuel flow will prevent compressor surge.

24. A system arrangement according to claim 23, further comprising means for stopping the integration of the speed governor signal at the magnitude value prevailing at the time when the speed governor output signal is limited to one of $\beta_{max}$ and $\beta_{min}$ during acceleration and deceleration until the output signal is no longer limited by one of $\beta_{max}$ and $\beta_{min}$.

25. A system arrangement according to claim 24, further characterized by means for setting a fuel control signal $\beta_5$ at a value of $\beta_{min}$ for a predetermined time interval in response to temperatures normally occuring during at least one of stabilized and transient operation of the engine being exceeded.

26. A system arrangement according to claim 25, further comprising secondary acceleration governor means for controlling acceleration in response to engine pressures falling below a predetermined value, said secondary acceleration governor means limiting the acceleration parameter of the engine rather than the compressor pressure ratio.

27. A system arrangement according to claim 26, further comprising pressure transducer means for providing electrical output signals in accordance with the sensed pressures, said pressure transducers being disposed in a heat insulated housing and protected against vibration, said housing being provided with thermostatically controlled heating system.

28. A system arrangement according to claim 27, further comprising a plurality of pressure transducer means calibrated for different pressure ranges extending over the operating pressure range of the engine for supplying electrical output signals corresponding to the pressure range thereof and means for receiving the appropriate signal from the transducer means corresponding to the existing pressure.

29. A system arrangement for the control of acceleration processes in gas turbine engines, especially gas turbine aero-engines of the type having a compressor operating in front of a combustion chamber and a turbine operating behind the combustion chamber, the system arrangement comprising means for measuring the actual ratio of pressures at the outlet and inlet of the compressor and providing output signal values indicative thereof, means for comparing the actual measured compressor pressure ratio signal values with a set of predetermined compressor pressure outlet to inlet ratio signal values for an operating range of the engine which predetermined pressure ratio signal values are set below the ratio level signal value corresponding to compressor surge over the operating range of the engine, and means responsive to the actual measured signal value of the compressor ratio exceeding the predetermined pressure ratio signal value for controlling the metered quantity of fuel supplied to the engine, the set of predetermined compressor pressure ratio signal values being a function of one of the relative compressor speed related to compressor inlet temperature $N/\sqrt{T_{t1}}$ and of relative compressor inlet mass flow related to compressor inlet conditions $M_1\sqrt{T_{t1}}/P_{t1}$ in accordance with the slope of the lines $N/\sqrt{T_{t1}}=$constant in the compressor characteristic, where N is the shaft rotational speed, $T_{t1}$ is the total temperature at the compressor inlet, $M_1$ is the compressor inlet mass flow, and $P_{t1}$ is the total pressure at the compressor inlet.

30. A system arrangement according to claim 29, wherein said means responsive to the actual measured signal value of the compressor pressure ratio exceeding the predetermined pressure ratio signal serves for reducing the metered fuel quantity.

* * * * *